(12) United States Patent
Nilheim

(10) Patent No.: US 8,136,788 B2
(45) Date of Patent: Mar. 20, 2012

(54) COUPLING ELEMENT FOR CONNECTING ACTUATOR TO VALVE

(75) Inventor: Jan Nilheim, Stockholm (SE)

(73) Assignee: Siemens Aktiengesellschaft, Munich (DE)

( * ) Notice: Subject to any disclaimer, the term of this patent is extended or adjusted under 35 U.S.C. 154(b) by 381 days.

(21) Appl. No.: 12/585,042

(22) Filed: Sep. 1, 2009

(65) Prior Publication Data
US 2010/0051848 A1 Mar. 4, 2010

(30) Foreign Application Priority Data
Sep. 1, 2008 (EP) .................................. 08015393

(51) Int. Cl.
*F16K 31/02* (2006.01)

(52) U.S. Cl. ......... 251/129.01; 251/129.11; 251/129.15; 285/280; 285/350; 285/382; 29/505; 29/510; 137/15.17

(58) Field of Classification Search ............. 251/129.01, 251/129.11, 129.15; 285/280, 350, 382; 29/505, 510; 137/15.17; 310/71; 335/278
See application file for complete search history.

(56) References Cited

U.S. PATENT DOCUMENTS

| | | | | |
|---|---|---|---|---|
| 2,132,326 | A * | 10/1938 | Stone | 285/382.2 |
| 2,543,088 | A * | 2/1951 | Woodling | 285/281 |
| 3,215,026 | A * | 11/1965 | Davis | 411/34 |
| 3,741,445 | A | 6/1973 | Green | |
| 3,948,142 | A * | 4/1976 | McKay et al. | 411/38 |
| 4,749,131 | A * | 6/1988 | Katchka | 239/567 |
| 5,163,468 | A | 11/1992 | Robinson et al. | |
| 5,294,223 | A * | 3/1994 | Phillips, II | 411/34 |
| 5,427,319 | A | 6/1995 | Bata | |
| 5,478,122 | A * | 12/1995 | Seabra | 285/281 |
| 5,529,282 | A * | 6/1996 | Lebkuchner | 251/129.12 |
| 5,533,765 | A * | 7/1996 | Williamson et al. | 285/212 |
| 5,626,369 | A * | 5/1997 | Shifman et al. | 285/38 |
| 6,378,167 | B1 * | 4/2002 | Howell et al. | 16/2.1 |
| 6,394,415 | B1 * | 5/2002 | Ohmi et al. | 251/129.16 |
| 6,761,520 | B1 * | 7/2004 | Dise | 411/38 |
| 6,851,723 | B2 * | 2/2005 | Usui et al. | 285/190 |
| 2001/0035510 | A1 * | 11/2001 | Oh | 251/129.03 |
| 2005/0044710 | A1 * | 3/2005 | Malone | 29/890.144 |

FOREIGN PATENT DOCUMENTS

| | | |
|---|---|---|
| DE | 197 05 721 | 8/1998 |
| DE | 200 01 605 U1 | 5/2000 |
| DE | 100 65 098 A1 | 7/2002 |
| DE | 100 65 098 B4 | 1/2004 |
| GB | 2 301 667 A | 12/1996 |
| GB | 2 312 269 A | 10/1997 |

* cited by examiner

*Primary Examiner* — John Rivell
*Assistant Examiner* — Minh Le
(74) *Attorney, Agent, or Firm* — Staas & Haley LLP

(57) ABSTRACT

A coupling element has a first interface, which is adapted to mechanically connect the coupling element to an actuator, a second interface, which is adapted to mechanically connect the coupling element to a valve, and a deformable portion, which is shaped in such a manner, that, as a result of a compression along an axial direction of the coupling element, the deformable portion irreversibly bends such that a projection is formed. Thereby, the projection is adapted to permanently engage with an annular groove formed at the actuator, such that the coupling element and the actuator are connected with each other in a non-detachable but rotatable manner.

14 Claims, 2 Drawing Sheets

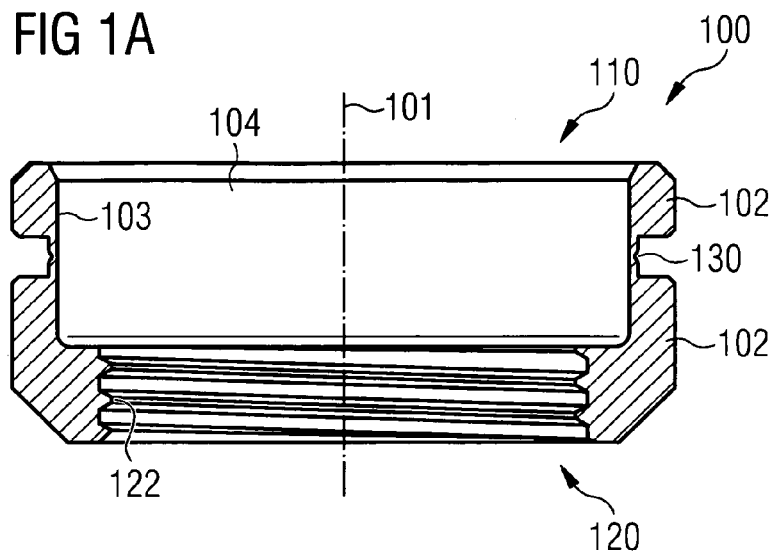
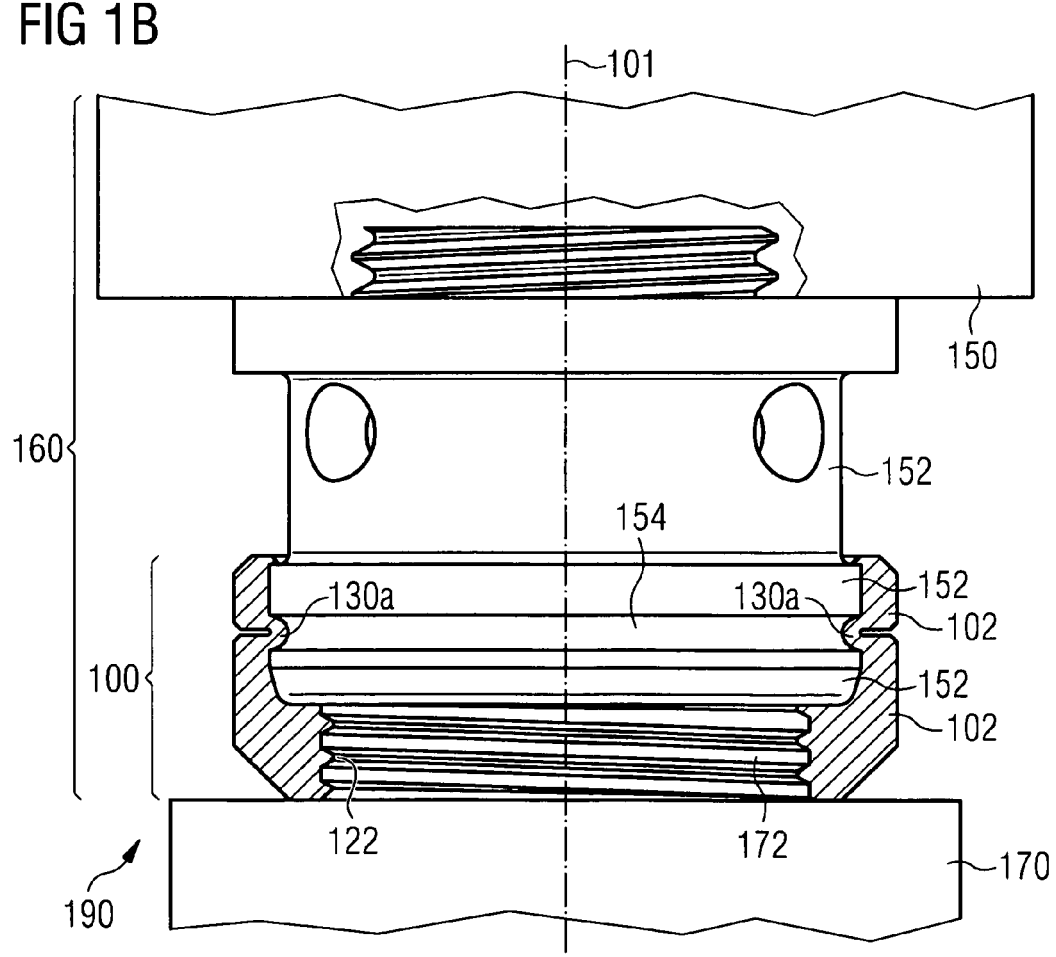

COUPLING ELEMENT FOR CONNECTING ACTUATOR TO VALVE

CROSS REFERENCE TO RELATED APPLICATIONS

This application is based on and hereby claims priority to European Patent Application No. 08015393 filed on Sep. 1, 2008, the contents of which are hereby incorporated by reference.

BACKGROUND

In the technical field of actuator controlled valves and a mechanical connection between a valve and a valve controlling actuator, described below is a coupling element for connecting an actuator to a valve in an actuator system for controlling the valve. Also described are a valve system, which includes the valve and the actuator system, and a method for connecting such a coupling element to an actuator.

It is known to regulate the temperature of rooms within a building by an actuator, which is connected to a valve controlling the flow rate through the interior of a radiator. Typically, the corresponding flow medium is hot water. When the hot water flows through the radiator, it transfers thermal energy to the radiator.

For controlling the position of radiator valves in particular electromechanical actuators are used. A correct operation of such a valve system having an actuator and a radiator valve relies on a stable mechanical connection between the actuator and the valve. Such a connection is usually established by a coupling element. Typically the coupling element is connected to the actuator in a non-detachable but rotatable manner. In the following an assembly that includes the actuator and the coupling element connected to the actuator will be referred to as an actuator system.

The coupling element may be a nut having an inner thread, which is suitable for engaging with an outer thread respectively a male thread of a valve body. Therefore, when mounting the actuator system to the valve body the nut has to be rotated at least with respect to the valve body.

When assembling the actuator system the nut has to be kept exactly in the axial position of the actuator. In order to provide for a rotatable connection between the nut and the actuator it is known to use plastic snapping hook elements being formed at the actuator in order to grip into a groove of the nut. Such hook elements typically allow for an easy assembling procedure for the actuator system. However, hook elements have the disadvantage that they can brake easily if the nut is tighten too hard.

Siemens Building Technologies introduced a much more stable solution for mechanically connecting a nut to a valve body. In the data sheet 4893 describing Electrical Actuators SSA31 . . . , SSA81 . . . and SSA61 . . . for radiator valves VDN . . . , VEN . . . , VUN . . . , VPD . . . and VPE . . . , CE1N4893en, dated Feb. 23, 2005 (see www.sbt.siemens.ru/files/13093.pdf, there are disclosed electrical actuator systems having a wire situated between an annular grove of the nut and a grove of an actuator neck. The disadvantage of this solution is the complicated manufacturing process. The first pass yield is too low and an automatic assembly of corresponding actuator systems is hardly possible.

There may be a need for providing a simple but mechanically stable connection between an actuator and a valve.

SUMMARY

According to a first aspect there is provided a coupling element for connecting an actuator to a valve, in particular for connecting an electrical actuator to a valve for controlling the operation of a radiator. The described coupling element includes (a) a first interface, which is adapted to mechanically connect the coupling element to the actuator, (b) a second interface, which is adapted to mechanically connect the coupling element to the valve, and (c) a deformable portion, which is shaped in such a manner, that, as a result of a compression along an axial direction of the coupling element, the deformable portion irreversibly bends such that a projection is formed. Thereby, the projection upraises from a side wall of the coupling element. Further, the projection is adapted to permanently engage with an annular groove being formed at the actuator such that the coupling element and the actuator are connected with each other in a non-detachable but rotatable manner.

The described coupling element is based on the idea that by purposeful deforming the deformable portion a projection can be formed, which is adapted to engage with the actuator respectively with an annular groove of the actuator. Thereby, a non-detachable but rotatable connection between the coupling element and the actuator will be established.

The described coupling element may provide the advantage that the production process of an actuator system, which can be connected to a valve body and which is capable of controlling the corresponding valve can be simplified. The production process includes mounting an appropriate coupling element to the actuator in a non-detachable but rotatable manner. Using the described second interface the coupling element can be mechanically connected to the valve.

For compressing the coupling element an appropriate tool such as a gripper or a crimper can be used.

The described side wall may be any inner or outer wall of the coupling element, which is oriented parallel to the axial direction. The axial direction may be defined by an axis, which represents a symmetry axis of the coupling element. In this respect the symmetry may an at least partially realized rotational and/or an axial symmetry.

The valve may be any device which is capable of controlling the flow rate of a liquid or gaseous medium. In particular, the valve may be a stroke valve, wherein the flow rate can be controlled simply be adjusting the position of a stroke, a plunger or a valve lifter.

According to an embodiment the coupling element further includes a central opening, which extends around a symmetry axis of the coupling element and which provides for a passage between the actuator and the valve.

The described central opening may provide the advantage that the actuator will be able to control a position of the valve in a usual manner. Thereby, for instance a pusher element can move through the central opening. The pusher element may be assigned to the actuator or to the valve.

According to a further embodiment the projection upraises inwardly into the central opening of the coupling element.

The described bending of the deformable portion towards the symmetry axis may provide the advantage that the projection will not be seen from the outside. This means that the coupling element can be realized without outer corners and/or outer ridges, which might cause a skin lesion to a person who is disregardful handling the coupling element. This holds both (a) for the described compression procedure resulting in the non-detachable but rotatable mechanical connection between the coupling element and the actuator and (b) for an attachment coupling procedure wherein the actuator together with the coupling element is attached to the valve.

According to a further embodiment the deformable portion extends along a circumference of the coupling element.

The deformable portion may extend substantially along the whole or at least along substantial the whole circumference of the coupling element. This may provide the advantage that the projection resulting from the described compression procedure engages not only at one or more selective circumferential regions but along at least substantial the whole circumference into the annular groove.

According to a further embodiment the second interface has a thread, which is adapted to connect to a complementary thread being formed at the valve. This may provide the advantage that the coupling element and with the coupling element also the actuator can easily be mounted to the valve. By screwing the coupling element into or onto the complementary thread of the valve the spatial distance between the actuator and the valve can be precisely adjusted.

According to a further embodiment the thread is an inner thread being adapted to engage with an outer thread being formed at valve. This may provide the advantage that the coupling element can have the general shape of a nut, which may be for instance a coupling nut. The nut may have an outer contour which can act together with a usual mechanical tool. The outer contour may have for instance a hexagonal shape and the mechanical tool may be for instance an open-end wrench. Of course also other outer contours may be used conveniently screwing the coupling element onto the complementary thread of the valve.

According to a further embodiment along the axial direction of the coupling element the deformable portion is located between the first interface and the second interface. This may provide the advantage that in the connected state the annular groove will be completely covered by the coupling element. Further, both in the uncompressed and in the compressed state, the coupling element may be realized with a comparatively smooth outer surface.

According to a further embodiment the deformable portion is a thin wall of the coupling element. In this respect the term "thin wall" means that the thickness of the wall is smaller than the thickness of the body of the coupling element. Thereby, the thickness is measured in a direction perpendicular to the symmetry axis of the coupling element.

The described thin wall may provide the advantage that the coupling element can be formed integrally by a single piece of material. The material may be in particular metal. However, also other materials such as for instance plastic can be used for manufacturing the described coupling element.

According to a further embodiment along the axial direction of the coupling element the deformable portion is located at an end of the coupling element. In this case, the compression of the coupling element may result in a brim and/or in a shoulder engaging into the annular groove of the valve.

According to a further aspect there is provided an actuator system for controlling a valve, in particular a valve for controlling the operation of a radiator. The described actuator system includes (a) an actuator and (b) a coupling element according to any one of the embodiments described above.

The described actuator system is based on the idea that by compressing the coupling element along its axial direction a non-detachable but rotatable connection between the coupling element and the actuator can be established in an effective manner. Of course, during the compressing procedure the coupling element and the actuator have to be arranged in a suitable spatial position with respect to each other.

According to a further embodiment the actuator has a neck portion having the annular groove, which is adapted to receive the projection formed from the deformable portion of the coupling element.

The neck portion may represent an intermediate component of the actuator which may allow that the coupling element can be easily connected to the actuator. It has to be mentioned that also the neck portion may have a central opening allowing that the actuator will be able to mechanically connect to the valve for instance by a pusher element move through the central opening.

According to a further embodiment the neck portion is a flange, which is adapted to connect to the coupling element. The flange may include the above described annular groove. The annular groove may extend along the whole or at least along substantially the whole circumference of the flange.

According to a further aspect there is provided a valve system. In particular there is provides a valve system for controlling the operation of a radiator. The provided valve system includes (a) an actuator, and (b) a valve. Thereby, the actuator and the valve are connected by a coupling element as described above.

Also the described valve system is based on the idea that by compressing the coupling element along its axial direction a non-detachable but rotatable and stable connection between the coupling element and the actuator can be established in an effective manner. Further, the coupling element and the valve can be mechanically connected to each other in a known manner such as for instance by complementary threads being formed at the coupling element and at the valve.

According to a further aspect there is provided a method for connecting a coupling element to an actuator. In particular there is provided a method for connecting a coupling element as described above to an electrical actuator. The provided method includes (a) bringing together the coupling element and the actuator, (b) compressing the coupling element along an axial direction of the coupling element, and (c) bending a deformable portion of the coupling element in an irreversible manner such that a projection upraising from a side wall of the coupling element is formed. Thereby, the projection permanently engages with an annular groove being formed at the actuator such that the coupling element and the actuator are connected with each other in a non-detachable but rotatable manner.

The described method is based on the idea that by simply bending the deformable portion of the coupling element a non-detachable but rotatable and stable connection between the coupling element and the actuator can be established by a very simple mechanical procedure. This procedure, which may result in a very reliable mechanical connection, can contribute to a simplified and cost effective manufacturing procedure of actuator systems, which are suitable for being connected to and for controlling a valve. The valve may be in particular a valve for controlling the operation of a radiator by regulating the flow rate of a liquid flowing through the interior of the radiator.

It has to be noted that embodiments have been described with reference to different subject matters. In particular, some embodiments have been described with reference to an apparatus whereas other embodiments have been described with reference to a method. However, a person skilled in the art will gather from the above and the following description that, unless other notified, in addition to any combination of features belonging to one type of subject matter also any combination between features relating to different subject matters, in particular between features of the apparatus and features of the method is considered as to be disclosed by this specification.

BRIEF DESCRIPTION OF THE DRAWINGS

These and further aspects and advantages will become more apparent and more readily appreciated from the exemplary embodiments described hereinafter with reference to the accompanying drawings of which:

FIG. 1a is a cross section of a coupling element with a thin wall, which upon a compression of the coupling element, irreversibly transforms into a projection upraising into a central opening of the coupling element.

FIG. 1b is a cross section of a valve system according to a first embodiment, the valve system including the coupling element depicted in FIG. 1a in the compressed state.

DETAILED DESCRIPTION OF THE PREFERRED EMBODIMENT

Figure 2:
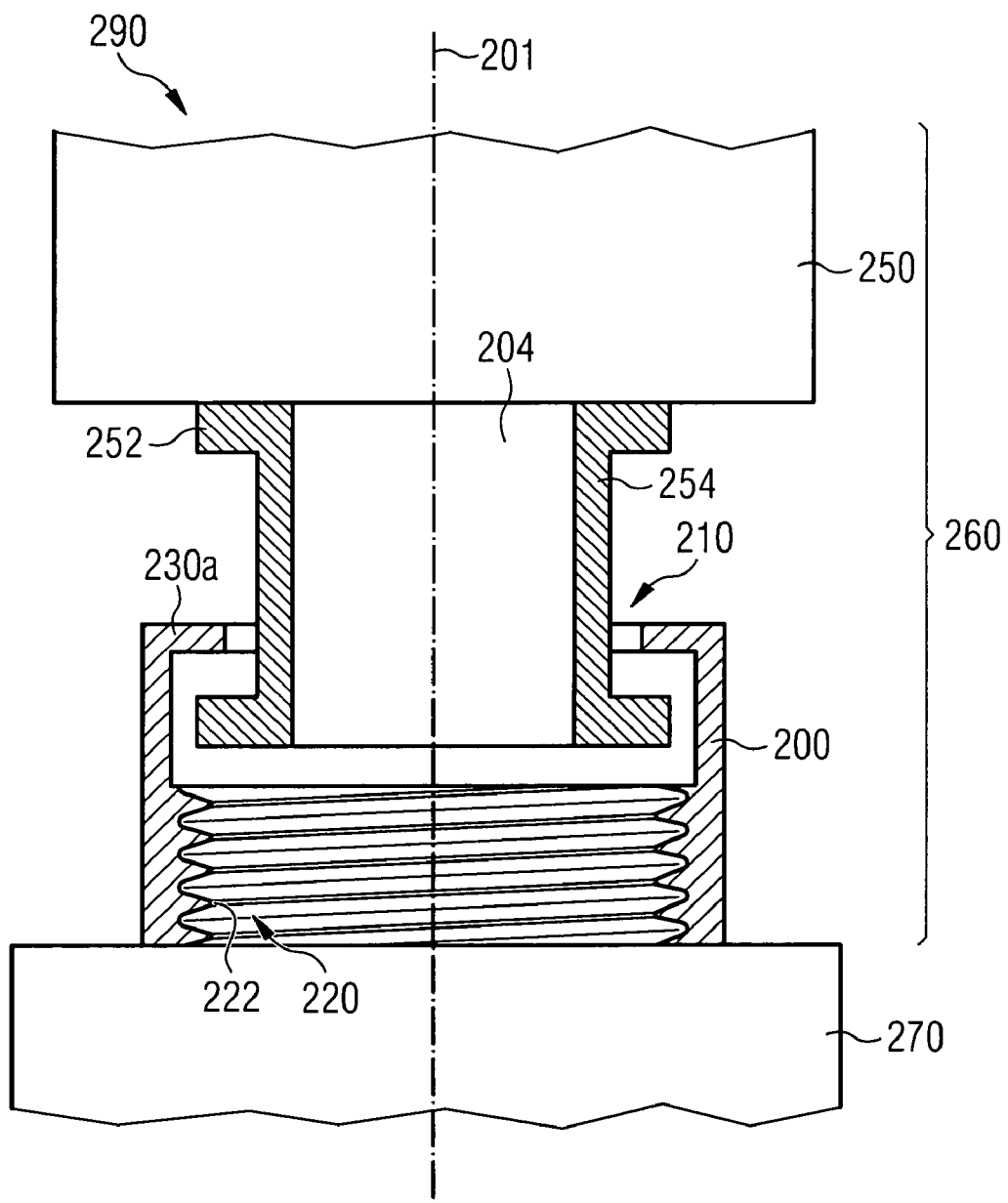
FIG. 2 is a cross section of a valve system according to a second embodiment, the valve system including a coupling element having a brim at one end, wherein the brim has been formed by compressing the coupling element.

Reference will now be made in detail to the preferred embodiments, examples of which are illustrated in the accompanying drawings, wherein like reference numerals refer to like elements throughout.

The illustration in the drawing is schematically. It is noted that in different figures, similar or identical elements are provided with the same reference signs or with reference signs, which are different from the corresponding reference signs only within the first digit.

FIG. 1a shows a coupling element 100 according to a first embodiment. FIG. 1a shows the coupling element 100 in an initial state before being connected to an actuator.

According to the embodiment described here the coupling element is a nut 100 having a symmetry axis 101. The nut 100 has a body 102 formed around the symmetry axis 101. A central opening 104 is formed within the body 102. A side wall 103 having substantially the shape of the side area of a cylinder defines the central opening 104. The outer lateral surface of the nut 100 has a hexagonal shape such that the nut 100 can be rotated, for instance, by an appropriate open-end wrench.

The nut 100 further has a first interface 110. As will be described below with reference to FIG. 1b, the first interface 110 is adapted to mechanically connect the nut 100 to an actuator.

The nut 100 further has a second interface 120. The second interface 120 includes an inner thread 122. As will be described below with reference to FIG. 1b, the second interface 120 is adapted to mechanically connect the nut 100 to a valve having a complementary outer thread.

The nut 100 further includes a deformable portion 130. According to the embodiment described here the deformable portion is a thin wall 130. The thin wall is formed in such a manner, that a compression of the nut 100 along an axial direction parallel to the symmetry axis 101 causes an irreversible bending of the deformable portion 130 such that a projection is formed.

FIG. 1b shows the nut 100 in the compressed state. The projection is indicated with reference numeral 130a. FIG. 1b further shows an actuator 150 being connected to the nut 100 and a valve 170 being also connected to the nut 100. In the following, the depicted assembly of the actuator 150, the nut 100 and the valve 170 is denominated a valve system 190. Further, the assembly of only the actuator 150 and the nut 100 is denominated an actuator system 160.

As can be seen from FIG. 1b, the projection 130a upraises from the side wall 103 (see FIG. 1a) towards the symmetry axis 101 of the nut 100. According to the embodiment described here the projection 130a extends along the whole circumference of the opening 104. Therefore, the projection 130a has the shape of a ring.

As can be further seen from FIG. 1b, the actuator 150 and the nut 100 are irreversibly connected to each other in a rotatable manner by the engagement between the projection 130a and an annular groove 154. The annular groove 154 is formed at a neck portion 152 of the actuator 150. According to the embodiment described here the neck portion 154 has the shape of a flange.

According to the embodiment described here the valve is connected to the nut 100 by an outer thread 172 being assigned to the valve 170. By screwing the nut 100 onto the outer thread 172 of the valve the spatial distance between the actuator 150 and the valve 170 can be precisely adjusted.

For connecting the nut 100 and the actuator 150 in a non-detachable but rotatable manner the nut 100 gets slide over the end portion of the actuator neck 152. Then a not depicted press device grips the upper and the lower surface of the nut 100 and squeezes it. Thereby, the projection 130a is formed because of the local plastically deformation of the nut 100. The projection 130a engages into the annular groove 154 of the actuator neck 152 resulting in an irreversible and stable mechanical connection. This manufacturing process, which can be automated with a high first pass yield, provides a stable contact surface to take the axial load of the nut 100.

Because of the projection 130a and the groove 154 extending around the whole circumference of the flange 152, the nut 100 cannot be tilted with respect to the actuator 150. By screwing the nut 100 onto the outer thread 172 of the valve 170, the front face of the actuator neck 152 and the opposing front face of the valve portion being provided with the outer thread 172 are pressed together. Thereby, a particular stable mechanical contact between the actuator 150 and the valve 170 can be guaranteed.

The described mechanical connection procedure connecting the actuator 150 and the valve 170 can be realized in a reliable manner resulting in an improved first pass yield with respect to known coupling procedures. Thereby, the manufacturing costs for the actuator system 160 can be reduced.

The described mechanical connection further has, for instance, the following advantages:

The described nut 100 substantially has the same outer contour as known nuts being used as a coupling element for connecting a valve with an actuator. Therefore, production equipment, which is used for producing known nuts can be used also for producing the nut 100 described in this patent application.

The described engagement of the projection 130a with a comparatively narrow groove 154 provides a bearing with respect to both axial directions being oriented parallel to the symmetry axis 101. Thereby, a mechanically strong connection can be realized in a simple manner.

The inner surface of the nut 100 and in particular the inner surface of the projection 130a can be realized very smooth. Therefore, the projection 130a will run very easy within the groove 154.

The nut 100 covers the whole groove 154. Therefore, there is only a very low risk of mechanically contaminating the groove 154.

The projection 130a may be formed in a ring shape simply by bringing a perpendicular force along the symmetry axis 101 on the nut 101.

FIG. 2 shows a valve system 290 according to a second embodiment. The valve system 290 includes a coupling element 200. By contrast to the nut 100 the coupling element 200 has its deformable portion not in the middle but at an end.

After a compression of the coupling element 200 along the symmetry axis 201, the deformable portion forms into a projection having the shape of a brim 230a. As can be seen from FIG. 2, the brim 230a engages into an annular groove 254 being formed at an actuator neck portion 252 of an actuator 250. As can be seen from FIG. 2 in comparison with FIG. 1b, by contrast to the groove 152, the groove 254 is much wider along the axial direction of the coupling element 200.

In accordance with the coupling element 100 also the coupling element 200 has (a) a first interface 210, which is adapted to mechanically connect the coupling element 200 to the actuator 250 and (b) a second interface 220, which is adapted to mechanically connect the coupling element 200 to a valve 270. A central opening 204 is provided within the coupling element 200 such that a mechanical passage between the actuator 250 and the valve 270 is possible. An actuator system including both the actuator 250 and the coupling element 200 is indicated in FIG. 2 with reference numeral 260.

In accordance with the embodiment shown in FIG. 1b, by screwing the coupling element 200, which has an inner thread 222, onto a not depicted outer thread of the valve 170, the spatial distance between the actuator 250 and the valve 270 can be precisely adjusted.

It should be noted that the terms "including" and "includes" do not exclude other elements or operations and "a" or "an" does not exclude a plurality. Also elements described in association with different embodiments may be combined.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A coupling element for connecting an electrical actuator to a valve for controlling the operation of a radiator, the coupling element comprising:
   a first interface adapted to mechanically connect the coupling element to the electrical actuator;
   a second interface adapted to mechanically connect the coupling element to the valve; and
   a deformable portion, shaped in such a manner, that, as a result of a compression along an axial direction of the coupling element, the deformable portion irreversibly bends such that a projection is formed, upraised from a side wall of the coupling element and adapted to permanently engage with an annular groove formed at the electrical actuator such that the coupling element and the electrical actuator are connected with each other in a non-detachable but rotatable manner.

2. The coupling element as set forth in claim 1, further comprising a central opening extending around a symmetry axis of the coupling element and providing for a passage between the electrical actuator and the valve.

3. The coupling element as set forth in claim 2, wherein the projection upraises inwardly into the central opening of the coupling element.

4. The coupling element as set forth in claim 3, wherein the deformable portion extends along a circumference of the coupling element.

5. The coupling element as set forth in claim 4, wherein the second interface comprises a thread adapted to connect to a complementary thread formed at the valve.

6. The coupling element as set forth in claim 5, wherein the thread is an inner thread adapted to engage with an outer thread formed at the valve.

7. The coupling element as set forth in claim 6, wherein along the axial direction of the coupling element, the deformable portion is located between the first interface and the second interface.

8. The coupling element as set forth in claim 7, wherein the deformable portion is a thin wall of the coupling element.

9. The coupling element as set forth in claim 6, wherein along the axial direction of the coupling element, the deformable portion is located at an end of the coupling element.

10. An actuator system for controlling a valve controlling operation of a radiator, the actuator system comprising:
    an actuator having an annular groove; and
    a coupling element, including
       a first interface adapted to mechanically connect the coupling element to the actuator;
       a second interface adapted to mechanically connect the coupling element to the valve; and
       a deformable portion, shaped in such a manner, that, as a result of a compression along an axial direction of the coupling element, the deformable portion irreversibly bends such that a projection is formed, upraised from a side wall of the coupling element and adapted to permanently engage with the annular groove of the actuator such that the coupling element and the actuator are connected with each other in a non-detachable but rotatable manner.

11. The actuator system as set forth in claim 10, wherein the actuator comprises a neck portion having the annular groove, which is adapted to receive the projection formed from the deformable portion of the coupling element.

12. The actuator system as set forth in claim 10, wherein the neck portion is a flange adapted to connect to the coupling element.

13. A valve system for controlling operation of a radiator comprising:
    an actuator;
    a valve; and
    a coupling element connecting the actuator and the valve, including
       a first interface adapted to mechanically connect the coupling element to the actuator;
       a second interface adapted to mechanically connect the coupling element to the valve; and
       a deformable portion, shaped in such a manner, that, as a result of a compression along an axial direction of the coupling element, the deformable portion irreversibly bends such that a projection is formed, upraised from a side wall of the coupling element and adapted to permanently engage with the annular groove of the actuator such that the coupling element and the actuator are connected with each other in a non-detachable but rotatable manner.

14. A method for connecting a coupling element to an electrical actuator, comprising:

bringing together the coupling element and the electrical actuator;

compressing the coupling element along an axial direction of the coupling element; and bending a deformable portion of the coupling element in an irreversible manner such that a projection upraised from a side wall of the coupling element is formed that permanently engages with an annular groove formed at the actuator, so that the coupling element and the actuator are connected with each other in a non-detachable but rotatable manner.

* * * * *